United States Patent [19]
Kabe

[11] Patent Number: 5,586,259
[45] Date of Patent: Dec. 17, 1996

[54] COMMUNICATION NETWORK APPARATUS

[75] Inventor: Akiyosi Kabe, Nagoya, Japan

[73] Assignee: Mitsubishi Denki Kabushiki Kaisha, Tokyo, Japan

[21] Appl. No.: 788,611

[22] Filed: Nov. 6, 1991

[30] Foreign Application Priority Data

Jan. 28, 1991 [JP] Japan ................... 3-008389

[51] Int. Cl.⁶ ................... G06F 15/16
[52] U.S. Cl. ................... 395/200.2
[58] Field of Search ............... 395/200, 200.2; 364/DIG. 1

[56] References Cited

U.S. PATENT DOCUMENTS 4,831,582  5/1989  Miller et al. ........... 364/DIG. 2
4,989,139  1/1991  Friedman et al. ........ 364/DIG. 1

FOREIGN PATENT DOCUMENTS 0299523  1/1989  European Pat. Off. .

OTHER PUBLICATIONS

W. Stallings, "Local Networks", Macmillan Publishing Company, N.Y., 1984 pp. 293–309.

Primary Examiner—Thomas M. Heckler
Attorney, Agent, or Firm—Rothwell, Figg, Ernst & Kurz

[57] ABSTRACT

A communication network apparatus accessed to a programmable logic controller (PLC) exclusive network from a manufacturing automation protocol (MAP) network. The PLC exclusive network uses an authorized protocol due to a specific vendor. A station number and control data within the PLC exclusive network is described by the same format (in a unified manner), Access is made from a host computer to PLC local stations in a gate-way manner (i.e., through a gate-way machine or apparatus).

4 Claims, 4 Drawing Sheets

5,586,259

COMMUNICATION NETWORK APPARATUS

FIELD OF THE INVENTION

The present invention generally relates to a communication network apparatus, and more particularly to a communication network apparatus for executing access between a network for an FA (factory Automation) apparatus using an authorized protocol of a specific vendor, and a network for a MAP (Manufacturing Automation Protocol) that is an international standard communication protocol.

BACKGROUND OF THE INVENTION

FIG. 1 of the attached drawings is a block diagram showing an arrangement of a conventional MAP communication network which uses a PLC (Programmable Logic Controller) as an example of an FA apparatus. In FIG. 1, the reference character 1b denotes a parameter or variable V; 2b, a MAP communication program B acting as a client who requires service; 3, a host computer for executing a client program; 7, a VMD (Virtual Manufacturing Device) acting as a virtual FA apparatus at executing a MAP communication from a client process; 8, a PLC driver for accessing the PLC; 9, a MAP interface unit mounted on the PLC for connecting the PLC to the MAP network; 10b, a computer interface which cannot directly be accessed to the PLC exclusive network; 11, a PLC master station mounted on the MAP interface unit 9 so as to be connected to the MAP network; 12, a PLC exclusive network interface mounted on the PLC; 13, a variable V in the PLC; 14, a PLC local station 1 in the PLC exclusive network; 15, a PLC local station n in the PLC exclusive network; 16, a PLC exclusive network; and 17, an application for connecting the computer interface 10b and the PLC exclusive network interface 12 to each other in the PLC master station 11.

Operation of the above-described conventional MAP communication network apparatus will next be described with reference to a flow chart illustrated in FIG. 2. First, the MAP communication program B 2b in the host computer 3 starts (step S21). Secondly, a MAP communication program B 2b designates a PLC local station 1 14 to command readout of the variable V13 in the PLC local station 1 14 to the VMD 7 in the MAP interface unit 9 in the PLC master station 11 (step S22). Thirdly, the VMD 7 transfers a station number 1 of the PLC network and the variable name "V" to the PLC master station 11 through the PLC driver 8 (step S23). Fourthly, the application 17 in the PLC master station 11 reads out a value of the variable V 13 in the designated station number 1 through the PLC exclusive network interface 12, to transfer the value of the variable V 13 to the MAP interface unit 9 (step S24). Fifthly, the VMD 7 of the MAP interface unit 9 transfers, to the host computer 3, a value transferred from the PLC driver 8 as the variable V13 in the PLC local station 1 14 (step S25).

The conventional MAP communication network apparatus is constructed as described above. Accordingly, the conventional MAP communication network apparatus cannot access directly to the master station or the local station in the PLC network from the MAP communication program in the host computer. It is necessary that the conventional MAP communication network apparatus is properly accessed to the master station and designates the station number of the PLC network, whereby the MAP communication network apparatus is accessed indirectly to the local station by the application in the master station. Accordingly, the PLC station requires an application which connects the computer interface and the PLC network interface to each other. As a result, the following problems arise. That is, maintainability of the PLC is inferior, and data throughput at access is also reduced or deteriorated.

Further, direct access cannot be made from the MAP communication program in the host computer to the master station or the local station in the PLC network. In other words, the MAP interface unit is directly accessed from the computer interface with respect to the master station, and the MAP interface unit designates the station number with respect to the local station, so that access is required to be made to the application in the master station. Accordingly, there is also a problem that programming in the MAP communication program in the host computer becomes complicated or troublesome.

SUMMARY OF THE INVENTION

It is therefore an object of the invention to provide a communication network apparatus which is capable of preventing deterioration of maintainability of a PLC resulting from the necessity of an application, which is capable of restraining reduction of data throughput at access, and which is capable of avoiding that programming in a MAP communication program in a host computer becomes complicated or troublesome.

According to the invention, there is provided a communication network apparatus for accessing a MAP network to an FA-apparatus exclusive network using an authorized protocol due to a specific vendor, wherein a station number and control data within the FA-apparatus exclusive network are described on the basis of the same format (i.e., in a unified manner) in each network.

According to the invention, there is further provided a communication network apparatus comprising:

a computer connected to a MAP network for executing communication according to a MAP;

a master FA apparatus connected to the MAP network for communicating with the computer;

a MAP interface unit mounted on the master FA apparatus;

an FA-apparatus exclusive network using an authorized protocol due to a specific vendor, the master FA apparatus being connected to the FA-apparatus exclusive network through the MAP interface unit; and a local FA apparatus connected to the FA-apparatus exclusive network, wherein a station number and control data within the FA-apparatus exclusive network are described on the basis of the same format as used in the MAP network, so that access can be made from the computer to the local FA apparatus in a gate-way manner (i.e., through a gate-way machine or apparatus).

According to the invention, there is also provided a communication network apparatus comprising:

a computer connected to a MAP network for executing communication according to a MAP;

a master FA apparatus connected to the MAP network for communicating with the computer;

a MAP interface unit mounted on the master FA apparatus;

an FA-apparatus exclusive network using an authorized protocol due to a specific vendor, the master FA apparatus being connected to the FA-apparatus exclusive network through the MAP interface unit;

a local FA apparatus connected to the FA-apparatus exclusive network;

a MAP communication program describing a station number and control data within the FA-apparatus exclusive network on the basis of the same format as the FA apparatus exclusive network to the computer;

a management table within the MAP interface unit for interpreting a station number and control data within the FA-apparatus exclusive network from a description of the same from the MAP communication program; and an expanded computer interface within the master FA apparatus for directly accessing the local FA apparatus through the FA-apparatus exclusive network to the master FA apparatus.

In the MAP communication program in the host computer, according to the invention, the variable V in the local station 1 in the FA apparatus is described in a unified manner, for example, as being #01.V by the identifier "#" representing the station number and the identifier "." separating the station number and the variable name from each other. Further, in the variable management table within the VMD in the MAP interface unit which is mounted on the master FA apparatus, interpretation is made with the station number 1 and the variable name V separated from each other. The VMD is accessed to the variable V in the local station 1 in the FA apparatus through the expanded computer interface in the master FA apparatus.

With the arrangement of the invention, in the MAP communication program in the host computer, the variable V, the program Domain__A and the practicing subject program Program__A in the PLC local station 1, for example, are described as being #01.V, #01.Domain__A and #01.Program__A, respectively, by the identifier "#" representing the station number and the identifier "." separating the station number and the names from each other. Thus, the unified description (due to the same format) is made possible. Accordingly, complicatedness or complexity in formation of the program can be reduced.

Furthermore, the above-described unified description is interpreted as being separated into the PLC local station 1, the program name Domain__A, the practicing subject program name Program__A and the variable name V by the program management table, the task practicing management table and the variable management table within the VMD in the MAP interface unit mounted on the PLC master station. The VMD is accessed to the program Domain__A, the practicing subject program Program__A and the variable V in the PLC local station 1 through the expanded computer interface in the PLC master station. As a result, the necessity that the program Domain__A, the practicing subject program Program__A and the variable V are accessed indirectly through the application in the PLC master station is eliminated, making it possible to improve the maintainability of the PLC and also to improve the data throughput at access.

Other objects and features of this invention will become understood from the following description with reference to the accompanying drawings.

DESCRIPTION OF THE EMBODIMENTS

Figure 1:
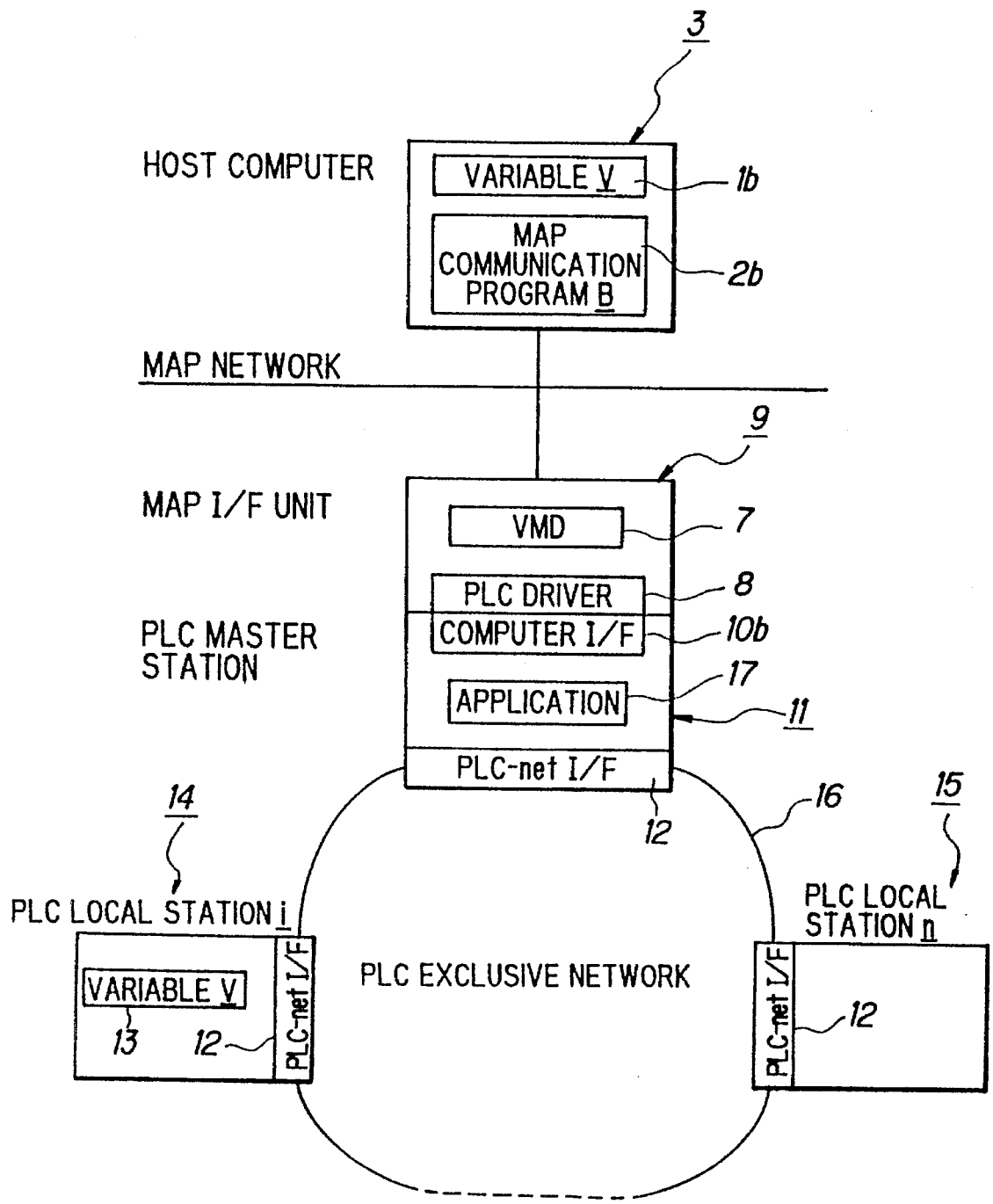
FIG. 1 is a block diagram showing a schematic arrangement of a conventional MAP communication network apparatus.
Figure 2:
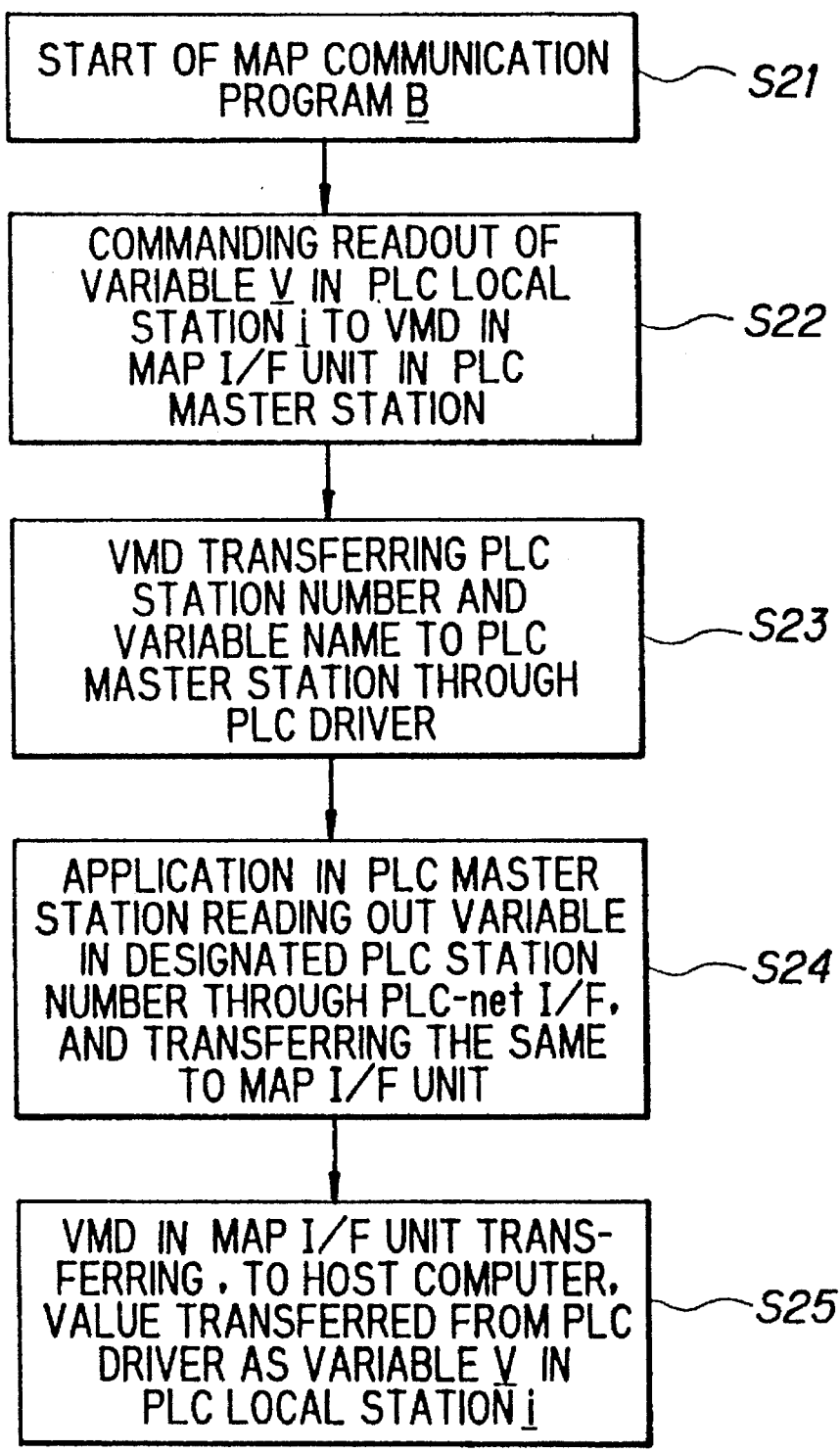
FIG. 2 is a flow chart showing operation of the MAP communication network apparatus illustrated in FIG. 1.
Figure 3:
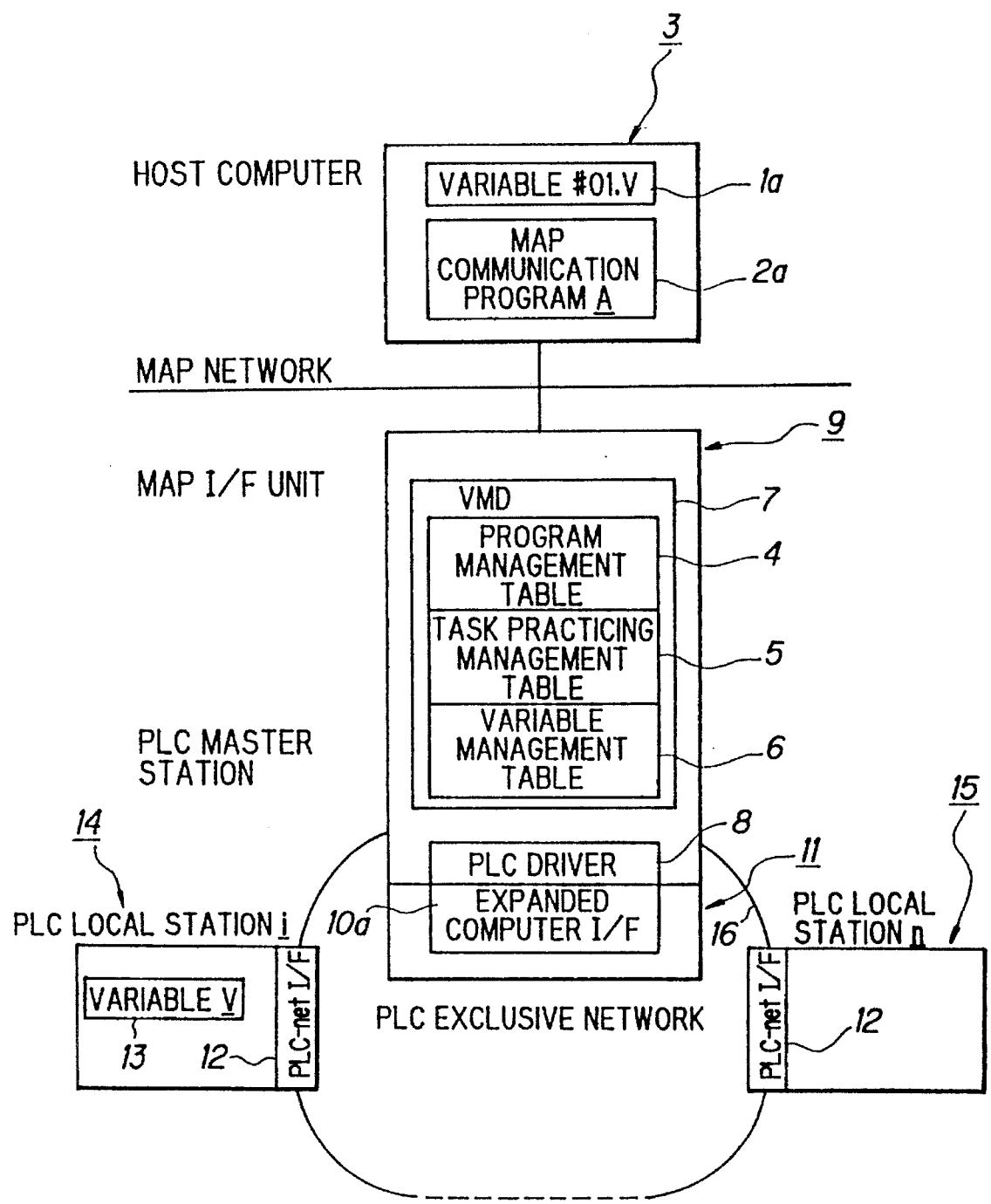
FIG. 3 is a block diagram showing a schematic arrangement of a MAP communication network apparatus according to the invention.

Referring first to FIG. 3, there is shown, in a block diagram, a MAP communication network apparatus, according to an embodiment of the invention, which uses a PLC as an example of an FA apparatus. In FIG. 3, the reference character 1a denotes a variable #01.V; 2a, a MAP communication program A acting as a client who requires service; 4, a program management table for interpreting that a station number within a PLC exclusive network 16 and a name of a program therewithin are separated from each other from description of a unified program; 5, a task practicing management table for interpreting that the station number within the PLC exclusive network 16 and the name of the practicing subject program are separated from each other from description of the unified practicing subject program; 6, a variable management table for interpreting that the station number within the PLC exclusive network 16 and the name of the variable are separated from each other from description of the unified variable; and 10a, an expanded computer interface capable of being accessed directly to the PLC exclusive network 16.

Operation of the MAP communication network apparatus constructed as described above will next be described with reference to a flow chart illustrated in FIG. 4. First, the MAP communication program A 2a in the host computer starts (step S41). Secondly, the MAP communication program A 2a commands readout of the variable #01.V 1a to a VMD 7 in a MAP interface unit 9 of a PLC master station 11 (step S42). Thirdly, the VMD 7 interprets, in the variable management table 6 therewithin, the variable #01.V 1a as being separated into the PLC local station 1 and the variable name V (step S43). Fourthly, the VMD 7 requires, to the PLC master station 11, readout of the variable name "V" in the PLC local station 1 in the PLC exclusive network 16 through a PLC driver 8 (step S44). Fifthly, the expanded computer interface 10a in the PLC master station 11 reads out a value of the variable V 13 of the designated station number 1 through a directly connected PLC exclusive network interface 12, to transfer the value to the MAP interface unit 9 (step S45). Sixthly, the VMD 7 in the MAP interface unit 9 transfers, to the host computer 3, the value transferred from the PLC driver 8 as the variable #01.V 1a.

Figure 4:
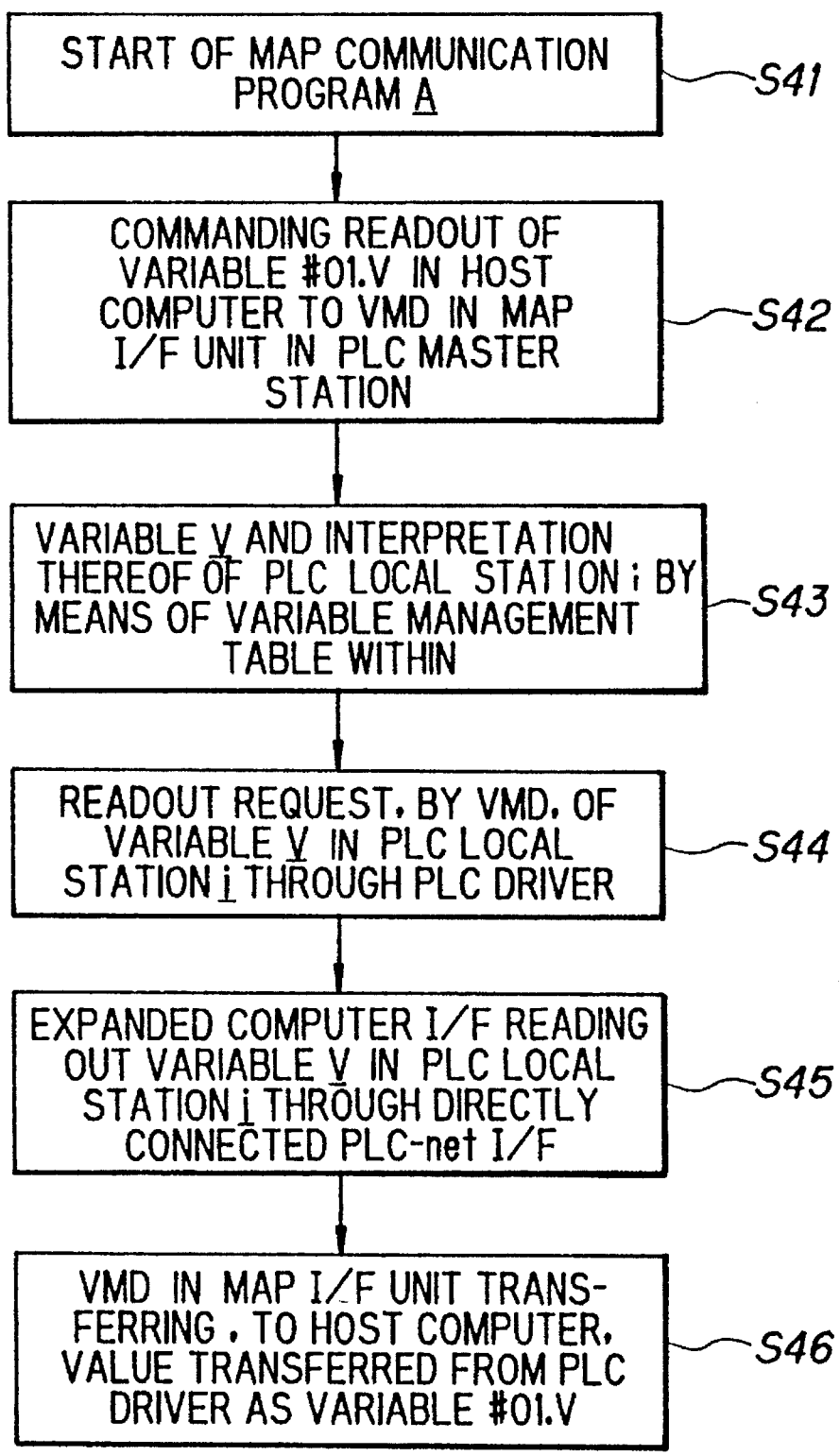
FIG. 4 is a flow chart showing operation of the MAP communication network apparatus illustrated in FIG. 3.

FIG. 4 shows operation in case of variable access. However, down-load and up-load of the program are also described in a unified manner such as #01.Domain, for example. The program management table 4 interprets #01.Domain__A as being separated into the PLC station number 1 and the program name Domain__A, and is accessed to the same.

Furthermore, control of the practicing subject program is also described in a unified manner such as #01.Program__A, for example. The task practicing management table 5 interprets #01.Program__A as being separated into the PLC station number 1 and the practicing subject program name Program__A, and is accessed thereto.

The embodiment of the invention has been described regarding the case of using the PLC as the FA apparatus. However, the embodiment is applicable also to an FA apparatus such as a numerical control apparatus, a robot and the like, in addition to the PLC.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication network apparatus for providing access from a MAP (Manufacturing Automation Protocol) network through a MAP interface to an FA (Factory Automation) apparatus exclusive network which uses an authorized protocol of a specific vendor and of a type having a master station and local stations addressed by station numbers and in which control data is transmitted to the local stations and is received from the local stations, said communication network apparatus comprising means for identifying said station numbers and said control data within said FA apparatus exclusive network on the basis of the same format as in the MAP network such that direct access to said local stations may be had from said MAP network through said MAP interface.

2. A communication network apparatus comprising:

a computer connected to a MAP (Manufacturing Automation Protocol) network for executing communication according to a MAP;

a master FA (Factory Automation) apparatus connected to said MAP network for communicating with said computer;

a MAP interface unit connected between said master FA apparatus and said MAP network;

an FA-apparatus exclusive network using an authorized network communication protocol of a specific vendor, said master FA apparatus being connected to said FA-apparatus exclusive network through said MAP interface unit; and at least one local FA apparatus connected to said FA-apparatus exclusive network, said local FA apparatus being identified by a station number and receiving and transmitting control data;

wherein station numbers and control data within said FA-apparatus exclusive network are specified in the same format as in the MAP network, so that access can be made from said computer directly to said local FA apparatus through said MAP interface unit functioning as a gate-way apparatus.

3. A communication network apparatus comprising:

a computer connected to a MAP (Manufacturing Automation Protocol) network for executing communication according to a MAP;

a master FA (Factory Automation) apparatus connected to said MAP network for communicating with said computer;

a MAP interface unit connected between said master FA apparatus and said MAP network;

an FA-apparatus exclusive network using an authorized network communication protocol of a specific vendor, said master FA apparatus being connected to said FA-apparatus exclusive network through said MAP interface unit;

at least one local FA apparatus connected to said FA-apparatus exclusive network, said local FA apparatus being identified by a station number and receiving and transmitting control data;

a MAP communication program within said computer, specifying station numbers and control data within said FA-apparatus exclusive network in a certain format to said MAP interface unit;

a management table for identifying station numbers and control data within said FA-apparatus exclusive network from specifications thereof by said MAP communication program supplied to said MAP interface unit; and an expanded computer interface for directly accessing said master FA apparatus to said local FA apparatus through said FA-apparatus exclusive network.

4. A communication network apparatus according to claim 3, wherein the FA apparatus are Programmable Logic Controller (PLC) apparatus, and wherein the management table comprises:

a program management table for identifying a station number within a PLC exclusive network and a name of a program therewithin from a specification thereof by said MAP communication program;

a task practicing management table for identifying a station number within the PLC exclusive network and a name of a practicing subject program therewithin from a specification thereof by said MAP communication program; and a variable management table for identifying a station number within the PLC exclusive network and a name of a variable therewithin from a specification thereof by said MAP communication program.

* * * * *

UNITED STATES PATENT AND TRADEMARK OFFICE
CERTIFICATE OF CORRECTION

PATENT NO.   : 5,586,259
DATED        : December 17, 1996
INVENTOR(S)  : Akiyoshi Kabe It is certified that error appears in the above-indentified patent and that said Letters Patent is hereby corrected as shown below:

Title page, item [75], inventor: change "Akiyosi to --akiyoshi--.
         item [57], Abstract: line 7, comma should be replaced with a period;
Column 1, line 59, "not access directly to the master" should be --not directly access the master--.

Signed and Sealed this

Twenty-third Day of September, 1997

Attest:

BRUCE LEHMAN

*Attesting Officer*    Commissioner of Patents and Trademarks